Patented Nov. 9, 1937

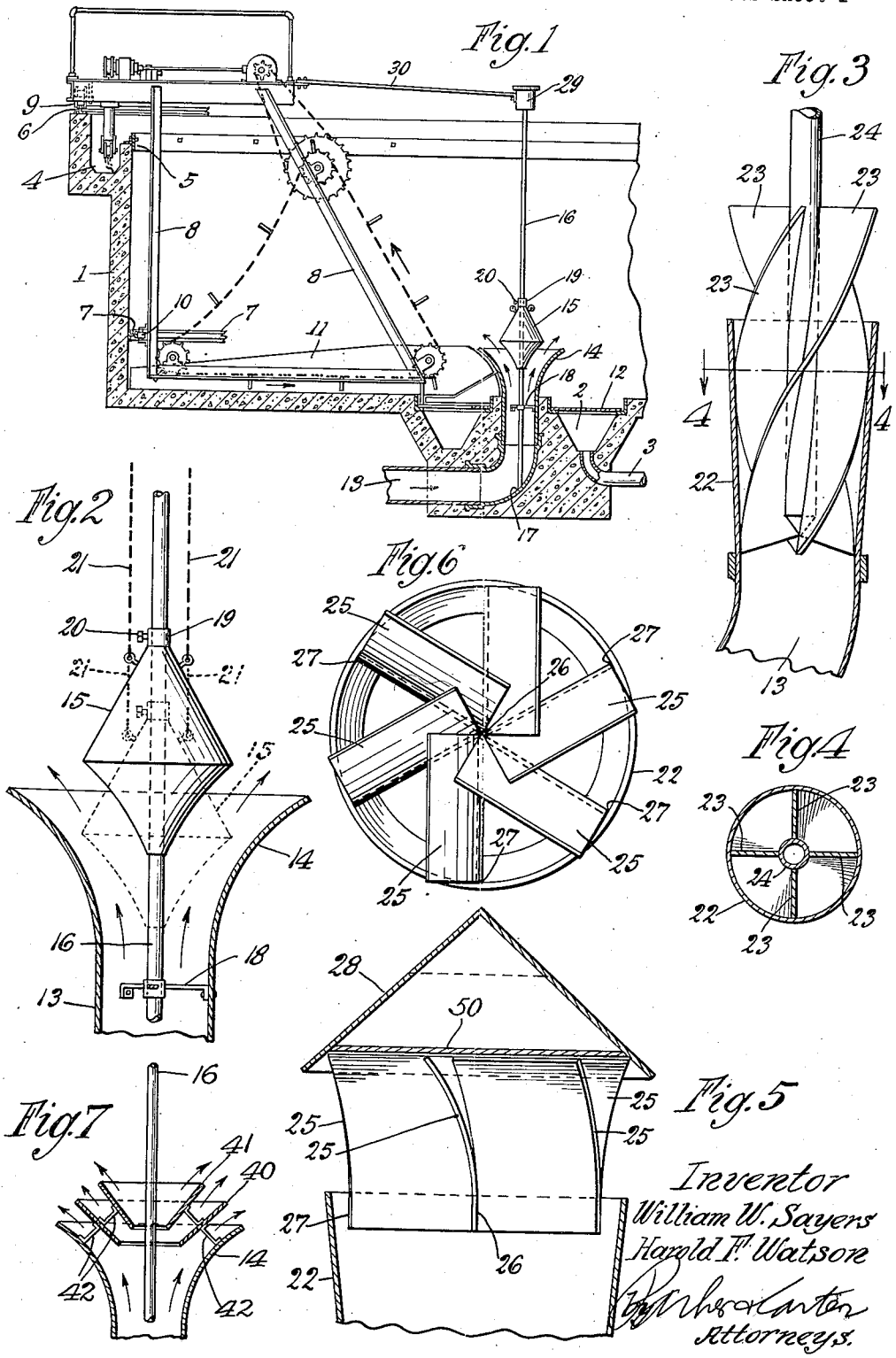

2,098,467

UNITED STATES PATENT OFFICE 2,098,467

SETTLING TANK

William W. Sayers, Chicago, Ill., and Harold F. Watson, Philadelphia, Pa., assignors to Link-Belt Company, Chicago, Ill., a corporation of Illinois Application June 15, 1935, Serial No. 26,781

4 Claims. (Cl. 210—55)

This invention relates to a settling tank and has for one object to provide means for introducing liquid carrying solid matter to a settling tank in such manner that the incoming liquid stream is caused to move slowly and is caused to spread out and to be diffused uniformly as nearly as possible through the entire depth of the tank or container into which it is introduced.

Another object is to provide a diffuser for use with settling tanks which causes the incoming current of liquid to be diffused as rapidly as possible, as widely as possible, as uniformly as possible and as soon as possible after entering the tank or container into which it is discharged.

A further object is to provide means, in connection with the influent opening, for preventing, as far as possible, the formation of cross currents and particularly the formation of currents along the surface of liquid within the tank.

A still further object is to provide means in connection with the influent conduit whereby the velocity of the influent liquid is checked and the tendency of the liquid to "boil" at the center of the tank is reduced because the liquid is spread and diffused. A further object is to permit rapid settling of the solids because the velocity of the influent is decreased and because it is spread or diffused.

Heretofore influent has been introduced into tanks of the type generally contemplated in the present invention, by providing a hollow column through which the influent is carried to practically the liquid level of liquid within the tank and then discharged at the center of the tank at this level. This method of introduction has a tendency to cause unnecessary agitation of the fluid within the tank and to permit the liquid and the solids contained in the liquid to "short circuit" and to pass directly to and over the influent weir around the periphery of the tank. Thus there is a tendency actually to prevent settling of the solids and in such settling as occurs the solids must settle from a point near the surface of the liquid and they are required to settle throughout practically the entire depth of the liquid and hence require a greater length of time to accomplish settling than that which is necessary with the short influent conduit shown in the present invention. Where the influent is introduced near the surface of the liquid in the tank it is introduced at maximum velocity which is a disadvantage, and a greater head is required than that which is necessary where the influent is introduced below the surface or at a point relatively close to the floor of the tank. The invention has among its objects the avoidance of the disadvantages just mentioned.

Other objects will appear from time to time in the course of the specification and claims.

The invention is illustrated more or less diagrammatically in the accompanying drawings, wherein—

Figure 1 is a generally vertical sectional view of a portion of a settling tank within which the diffuser is installed;

Figure 2 is a generally vertical sectional detail on an enlarged scale showing the diffuser of Figure 1;

Figure 3 is a view generally similar to Figure 2 showing a modified form;

Figure 4 is a transverse, generally longitudinal section taken along the line 4—4 of Figure 3;

Figure 5 is a view generally similar to Figures 2 and 3 showing a modified form of diffuser;

Figure 6 is a plan or end view of the diffuser of Figure 5;

Figure 7 is a side elevation of a further modification wherein a series of guide or deflector funnels are used;

Figure 10:
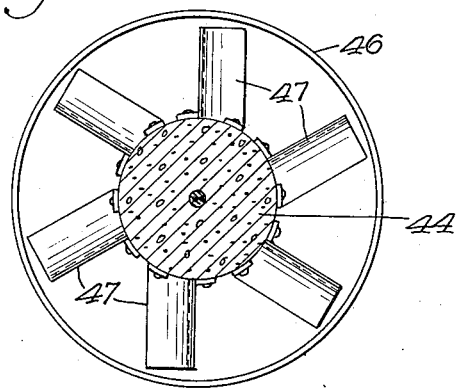
Figure 11:
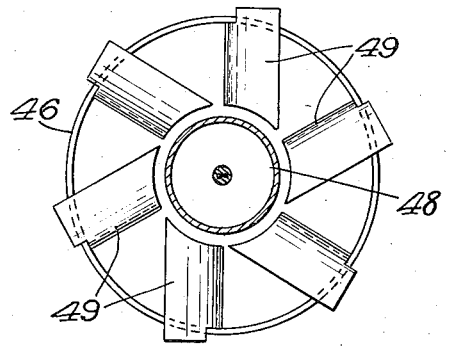
Figure 8:
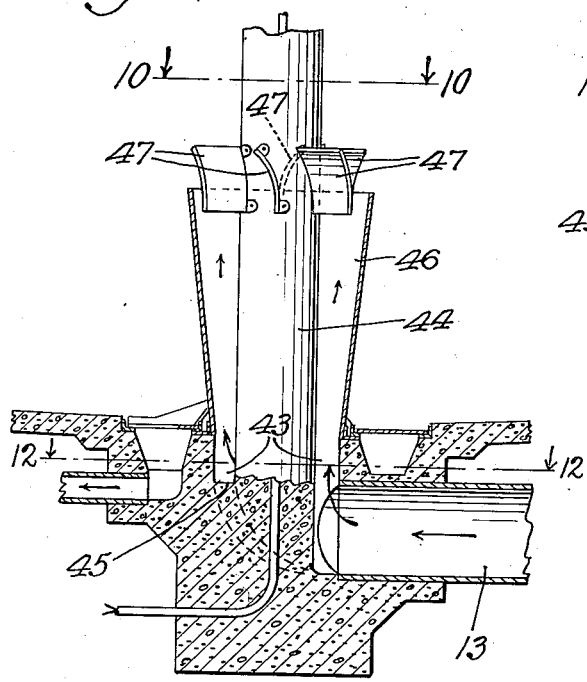
Figure 8 is a modified form where a deflector is used with a central column.
Figure 9:
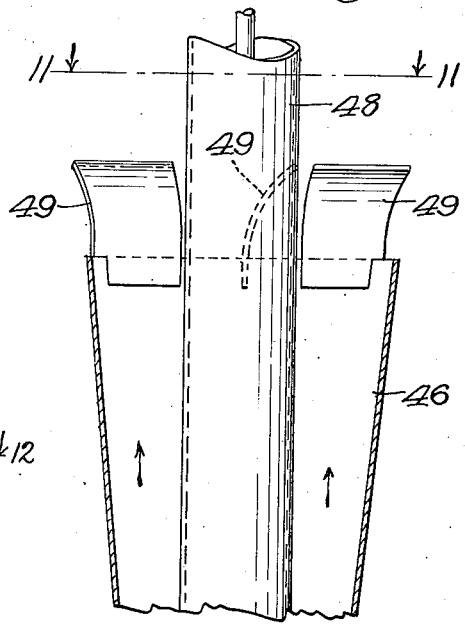
Figure 9 is a similar detail side elevation.
Figure 12:
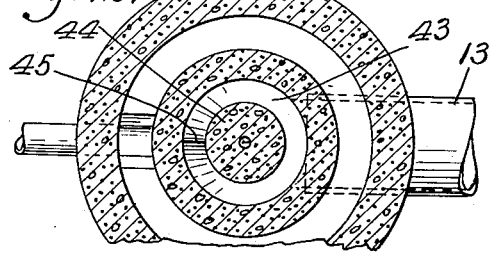

Figures 10 and 11 are sections respectively along the lines 10—10 and 11—11 of Figures 8 and 9, respectively;

Figure 12 is transverse section taken at line 12—12 of Figure 8.

Like parts are designated by like characters throughout the specification and drawings.

While the apparatus of the invention is shown as applied to a round settling tank particularly adapted for the settling of the sludge in sewage treatment, it may be used in other associations and it may be used in connection with a tank of any size or shape, whether or not that tank be provided with skimming, conveying, sweeping or other material handling apparatus.

I is a tank which may have an annular sludge receiving trough 2, from which an outlet 3 leads. It may have an overflow trough 4 and an adjustable weir 5. About its exterior a concentric track 6 is mounted and along the inside one or more tracks 7 may be mounted. A bridge structure 8 is carried upon rollers 9 and 10 which run respectively on the tracks 6 and 7. The details of the bridge structure form no part of the present invention and they are illustrated diagrammatically only as indicating that some form of bridge structure may be positioned for movement within a tank in which the diffuser is to be installed. A sludge blade 11 is mounted at the bottom of the bridge structure and means are provided for causing the bridge to move about the tank and when this is done the sludge blade scrapes or cleans the bottom of the tank. An additional conveyor, indicated in dotted lines, may be mounted on the bridge structure and moves in the direction of the arrow to convey sludge toward the center of the tank and move it into the sludge hopper. The sludge hopper may have a cover 12 which is provided with an opening adjacent the inner end of the bridge so that material conveyed toward the hopper by the radial conveyor may pass through this opening in the cover and be discharged into the sludge hopper.

Influent enters the tank through an inlet pipe or conduit 13 which is provided with an open, preferably flared discharge member 14. This inlet will cut down the velocity of the incoming sewage and give fairly good distribution. If better distribution is desired, additional apparatus may be added. A diffuser 15, having a generally conical upper and lower surface, is mounted preferably within the flared portion 14. As shown it is carried upon a post 16 which at one end, as at 17, is positioned in the inlet conduit 13 and elsewhere is braced by members 18. The diffuser proper, 15, may be adjusted up and down the rod 16 so as to be moved into and out of the member 14 a greater or less distance as desired. As shown the adjustment is accomplished by a collar 19 having a set screw 20. Any adjusting means may be provided, for example, means for raising and lowering the diffuser from above. In Figure 2, lines 21 are shown attached to the diffuser 15 and by means of them the diffuser may be raised or lowered. The lines may be attached to any suitable attaching means.

In the modified form shown in Figures 3 and 4, the influent conduit, instead of having the widely, outwardly flared portion 14 is provided with a relatively slightly flared member 22. Within it are positioned a plurality of curved blades 23. As shown these blades are fastened at their inner edges to a rod or column 24. This column may be short, as shown, or it may extend above the surface of the liquid in the tank and may then be used to support a portion of the equipment in the tank. It may be used as a support for electrical equipment and as a container for an electrical conduit.

As shown in Figure 5, a further modified form of diffuser is used. In this form the member 22 has positioned in or near its open upper end another type of diffuser. This comprises a plurality of inclined and curved plates 25 which are joined toward their lower ends centrally as at 26 and which are welded or otherwise securely fastened to the interior of the member 22 and at their outer edges as at 27. A conical deflector 28 may or may not be positioned upon the upper end of this diffuser and the upper end of the deflector may be closed as indicated in full lines in Figure 5 or cut off or open as indicated in dotted lines in that figure.

It will be noted that the diffuser of Figures 1 and 2 provides for a spreading, diffusing action. The fluid as it is discharged into the tank contacts and is spread out by the diffuser member 15. While that member is shown with generally conical upper and lower surfaces, it is to be noticed that the lower surface, instead of being a true cone, is actually curved and the curvature is approximately the same as the curvature of the spreader 14. The shape of the diffuser 15, however, may be almost infinitely varied. It might be a true cone or it might be otherwise curved and the upper surface of the diffuser 15 need not be conical as shown, but might be any other desired shape.

The diffusers of Figures 3 to 6, inclusive, provide a lateral diffusing or spreading but provide in addition a vortex action so that the entering current of influent liquid is not only spread or diffused laterally but is additionally given a vortex movement so that as it moves into the body of the liquid within the tank it absorbs the energy of the incoming liquid and prevents cross currents toward the periphery of the tank.

It will be realized that whereas I have herewith shown and described a practical operative device, nevertheless many changes might be made in the size, shape, number and disposition of parts without departing from the spirit of the invention and, therefore, I wish that my showing be taken as in a sense diagrammatic.

While a generally conical baffle is shown in Figure 5, it is to be understood that this baffle might be of any desired shape and it is to be further understood that a baffle of this or any other desired shape might be used in connection with each of the other forms of diffusers shown in the other figures.

Where a bridge or other sludge collecting mechanism is used, such mechanism ordinarily must be caused to move about the tank and frequently it is convenient to use a motor mounted on the bridge or collector and moving with it as the driving means. Where this is the case the rod 16 may be upwardly extended, as shown in Figure 1, to a point above the surface of the liquid and when so extended will carry a current collector 29. The collector is then preferably attached to the bridge mechanism by a rigid link 30 so that as the bridge moves about the tank the collector moves with it, being drawn by the rigid link or rod 30. Frequently it is desirable to have the current conducted to the motor in some other manner different from that shown. One other method of accomplishing the current supply is to install electric wires along the periphery of the tank and to use trolleys or other pick-up means or as a possible further modification the current may be brought down overhead to the center of the tank and the invention is, therefore, not limited to a device in which current is brought in at the center of the tank. Whether or not the rod 16 of the form of the invention shown in Figure 1 or the rod 24 of the form shown in Figure 3 is extended over the surface of the liquid in the tank, either to serve as a carrier for an electric connection or to serve as a support for a portion of the collector mechanism, the diffuser elements of the various forms shown operate as shown and described, that is to say, the operation of the diffusers is not altered by the fact that the rod in question may or may not perform a function additional to that of supporting the diffuser.

In the device of Figure 7, a series of separate conical deflectors 40, 41 are supported by brackets 42, in the mouth of the funnel 14. These deflectors are open at their centers so that the effluent can pass up through them and part of the stream will be deflected outwardly by the member 40 and part of the stream by the member 41 and the remainder will pass through the member 41.

In Figure 5 is shown a cross plate 50 which closes the space between the deflectors so that there is no possibility of a direct upward flow of any of the influent.

In the devices shown in Figures 8, 9, 10 and 11, is shown a modified form of structure where the deflector blades are used in connection with a central support for the collecting bridge. In this case the influent comes in through the passage 13 as before. It discharges into an annular chamber 43 encircling the concrete column 44. This annular chamber has a curved guiding bottom coming to a peak as at 45 diametrically opposite the influent 13 so that there will be an upward non-eddying flow of the material out through the funnel 46; the funnel 46 encircles the column 44 and the column 44 carries the deflector blades 47 located in the mouth of the funnel 46 but not in actual contact with it.

In Figure 9, the column instead of being of concrete is a hollow metallic column 48 and the deflector blades 49 are mounted on the funnel 46.

The use and operation of our invention are as follows:

However the diffuser is associated with a tank or with a conveyor or gathering mechanism for moving the sludge, the diffusers of any of the forms shown provide means for controlling and discharging the flow of liquid so that diffusion will take place generally throughout the entire depth of the tank and towards the periphery, as soon as the influent leaves the deeply submerged nozzle. In some forms of the invention the liquid, as it leaves the upwardly open nozzle, contacts the plurality of guide vanes which impart a rotary or vortex movement to the jet of liquid and so prevent its rising directly to the surface and there blooming out to cause flow across the surface toward the edges of the tank. Such flow is to be avoided and the devices of the present invention successfully avoid it.

Whether the curved guide blades or the cone diffuser of Figures 1 and 2 are used, the same general result to greater or less degree is produced.

We claim:

1. In combination, a shallow tank having an open top and a flat floor, an effluent weir about the periphery of and adapted to control the level of the liquid within the tank, an influent conduit beneath the bottom, extending from a point outside the boundary of to a point adjacent the center of the tank and there projecting upwardly through the floor, an upwardly and outwardly expanding influent nozzle having its discharge orifice at a point intermediate the floor of the tank and the liquid level as determined by said weir, said influent conduit discharging into said nozzle, deflecting vanes at the discharge orifice masking a portion thereof and curved to guide fluid discharged through the orifice along radial and spiral paths as it passes into the body of the liquid.

2. In combination, a shallow tank having an open top, a generally flat floor, a sludge trough in the floor at a point widely spaced from the walls, a sludge conveyor mounted for movement adjacent the floor and adapted to convey settled sludge to the trough, an effluent weir about the periphery of and adapted to control the level of the liquid in the tank, an influent conduit extending beneath the bottom of the tank from a point outside the boundary thereof to a point adjacent the sludge trough and there continuing upwardly through the floor, an upwardly and outwardly expanding nozzle in continuation of the conduit having its discharge orifice at a point above the floor of the tank and below the liquid level as determined by said weir, and guide means partially within and partially outside of the nozzle for gradually changing the direction of flow of the effluent and guiding it upwardly and outwardly toward the weir.

3. In combination, a shallow tank having an open top, a generally flat floor, a sludge trough in the floor at a point widely spaced from the walls, a sludge conveyor mounted for movement adjacent the floor and adapted to convey settled sludge to the trough, an effluent weir about the periphery of and adapted to control the level of the liquid in the tank, an influent conduit extending beneath the bottom of the tank from a point outside the boundary thereof to a point adjacent the sludge trough and there continuing upwardly through the floor, an upwardly and outwardly expanding nozzle in continuation of the conduit having its discharge orifice at a point above the floor of the tank and below the liquid level as determined by said weir, and guide means partially within and partially outside of the nozzle for gradually changing the direction of flow of the effluent and guiding it upwardly and outwardly toward the weir, such means being provided with parts directed to distribute the flow generally uniformly about the nozzle.

4. In combination, a shallow tank having an open top, a generally flat floor, a sludge trough in the floor at a point widely spaced from the walls, a sludge conveyor mounted for movement adjacent the floor and adapted to convey settled sludge to the trough, an effluent weir about the periphery of and adapted to control the level of the liquid in the tank, an influent conduit extending beneath the bottom of the tank from a point outside the boundary thereof to a point adjacent the sludge trough and there continuing upwardly through the floor, an upwardly and outwardly expanding nozzle in continuation of the conduit having its discharge orifice at a point above the floor of the tank and below the liquid level as determined by said weir, and vanes at the discharge orifice, masking a portion thereof, in the path of the column of liquid discharged thereby and adapted to gradually deflect some of the influent liquid from and direct it along spiral lines of travel toward the entire periphery of the tank.

WILLIAM W. SAYERS.
HAROLD F. WATSON.